G. W. GOODWYN.
Nut-Lock.
No. 200,862. Patented March 5, 1878.
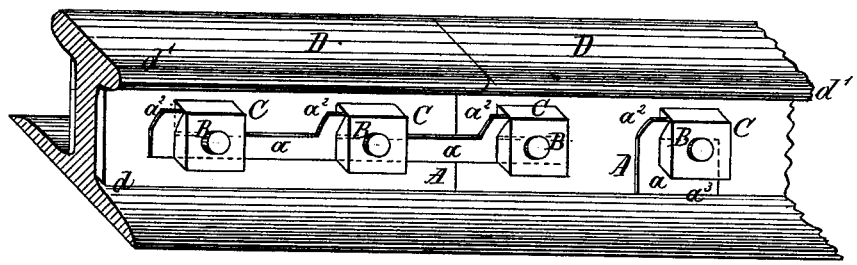
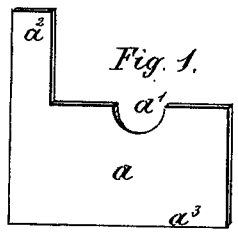
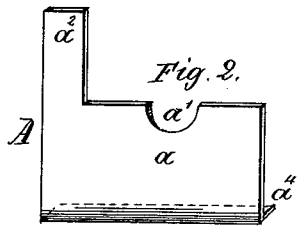
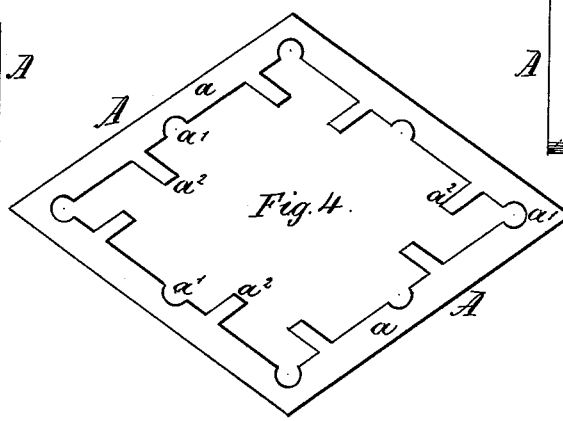
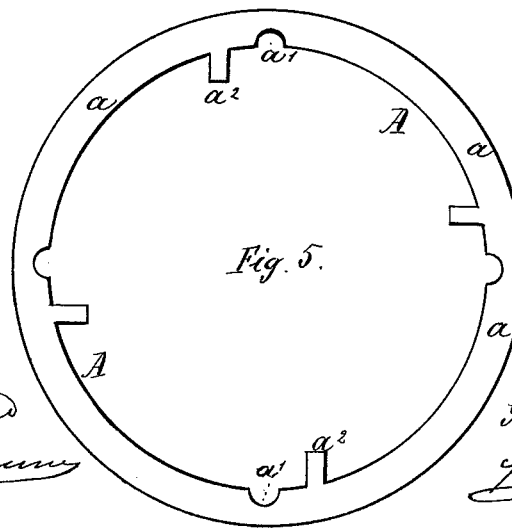
Witnesses
Alf. L. Leonard
Henri Guillaume
Inventor
George. W. Goodwyn
Henry Orth
atty.

UNITED STATES PATENT OFFICE.

GEORGE W. GOODWYN, OF PETERSBURG, VIRGINIA, ASSIGNOR OF TWO-THIRDS HIS RIGHT TO JOHN C. GRIFFIN AND GEORGE S. BERNARD, OF SAME PLACE.

IMPROVEMENT IN NUT-LOCKS.

Specification forming part of Letters Patent No. 200,862, dated March 5, 1878; application filed December 6, 1877.

*To all whom it may concern:*

Be it known that I, GEORGE W. GOODWYN, of the city of Petersburg, in the county of Dinwiddie and State of Virginia, have invented certain new and useful Improvements in Combined Skeleton - Washers and Nut-Locks, of which the following is a specification:

My invention has for its object the economical construction of a washer and nut-lock combined, and its ready application either to a single nut and bolt or to a series of such, as fully described hereinafter, and shown in the accompanying drawings, in which—

Figures 1 and 2 are perspective views of a washer constructed according to my invention. Fig. 3 is a similar view, showing the application of the washer, in conjunction with fish-plates, for joining two sections of railroad-rails; and Figs. 4 and 5 are elevations or front views of washers adapted to lock a series of nuts.

In the drawings similar letters of reference are employed in all the figures to indicate corresponding parts wherever such may occur.

A is the washer, consisting of a skeleton-plate, $a$, so constructed that but one-half of the nut will rest thereon. The plate is provided with a semicircular slot or notch, $a^1$, for the reception of the bolt B, and with a projecting tongue, $a^2$, of a length equal to the side of the nut C, or nearly so. This tongue or projection $a^2$ is so located that when the washer is in place under the nut it (the tongue) will lie in a position just outside of the said nut, and when the latter is screwed home on the bolt B the nut is locked by bending the tongue forward, as shown in Fig. 3.

When the washer is employed upon railroad rails, the plate A is made of such size that its edge $a^3$ will rest upon the lower flange or seat $d$ of the rails D; or the washer may be reversed, so that the edge $a^3$ will abut against the under side of the tread $d'$ of the rails D.

When the washer is employed upon plane surfaces of machinery, the plate $a$ is bent at right angles at its edge $a^3$, so as to form a lip or flange, $a^4$, as shown in Fig. 2, a corresponding recess being made in the face of the supporting plate or piece of machinery to receive the flange of the plate $a$.

Instead of the flange $a^4$, the plate may be provided with two or more spurs, bent at right angles, to enter into recesses formed for their reception, as in the case where the flange is employed.

When it is desired to lock a series of nuts by one skeleton-washer, a plate is employed having a series of semicircular notches, $a^1$, and a series of tongues, $a^2$, located in the proper position to fit under the series of nuts and receive their respective bolts. The particular form of these plates is then immaterial, as they may be made square, polygonal, semicircular, circular, or elliptical, or any other form, according to the position of the series of bolts and nuts which it is desired to lock, some of these forms of washers being illustrated in Figs. 3, 4, and 5.

By the construction of a skeleton-washer having a tongue, as described, I am enabled to produce a cheap and effective washer and nut-lock combined, a great saving of material being effected in the first place, as well as a saving of labor in their construction, as they may be struck out by dies or other equivalent means; but these are not the only advantages derived from this peculiar construction of skeleton-washer and nut-lock, as it will be seen at a glance that the washer may be applied or removed from under the nut without removing the latter by simply loosening said nut slightly on the bolt, which cannot be done when washers as now constructed are employed, thus again effecting a great saving in time when worn-out or broken washers are to be removed and replaced by new ones.

I am aware that washers having one of their sides slitted to form a tongue to be bent forward to form the lock to the nut have, previous to this invention, been in use, and I do not wish to claim the use of such tongue broadly.

I am also aware that washers adapted to lock a series of nuts by means of tongues or lips struck up from such washers are not new, and I do not claim any of the above constructions; but What I do claim is—

1. A skeleton-washer consisting of a plate, $a$, having one or more semicircular notches, $a^1$, and one or more tongues or projections, $a^2$, substantially as described, for the purpose specified.

2. A skeleton-washer consisting of the plate $a$, having a semicircular notch, $a^1$, a tongue, $a^2$, and the flange or rib $a^4$, or its equivalent, substantially as described, for the purpose specified.

In witness that I claim the foregoing I have hereunto set my hand.

GEO. W. GOODWYN.

Witnesses:
 P. M. HUTCHELL,
 P. T. BURTON.